Figure 1:
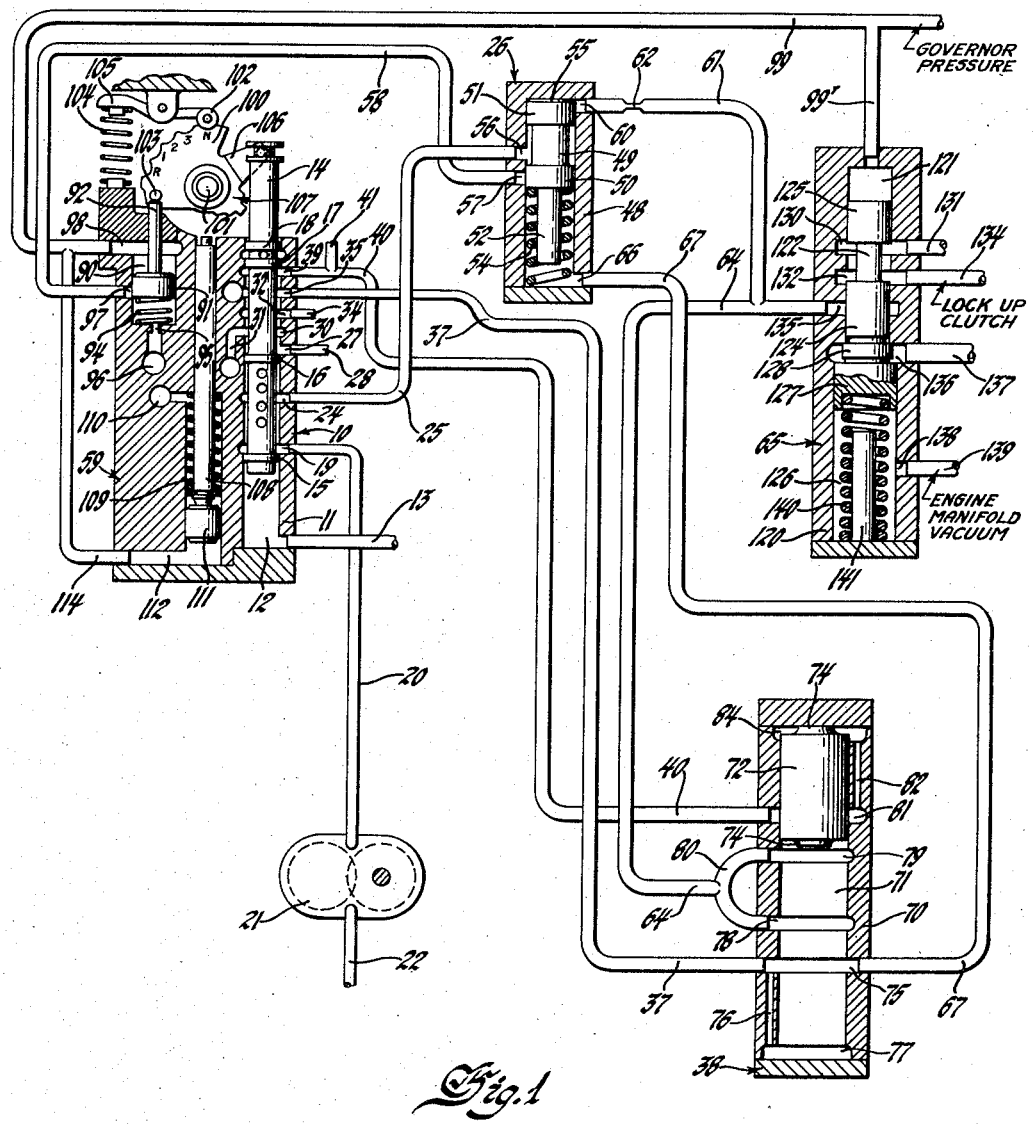

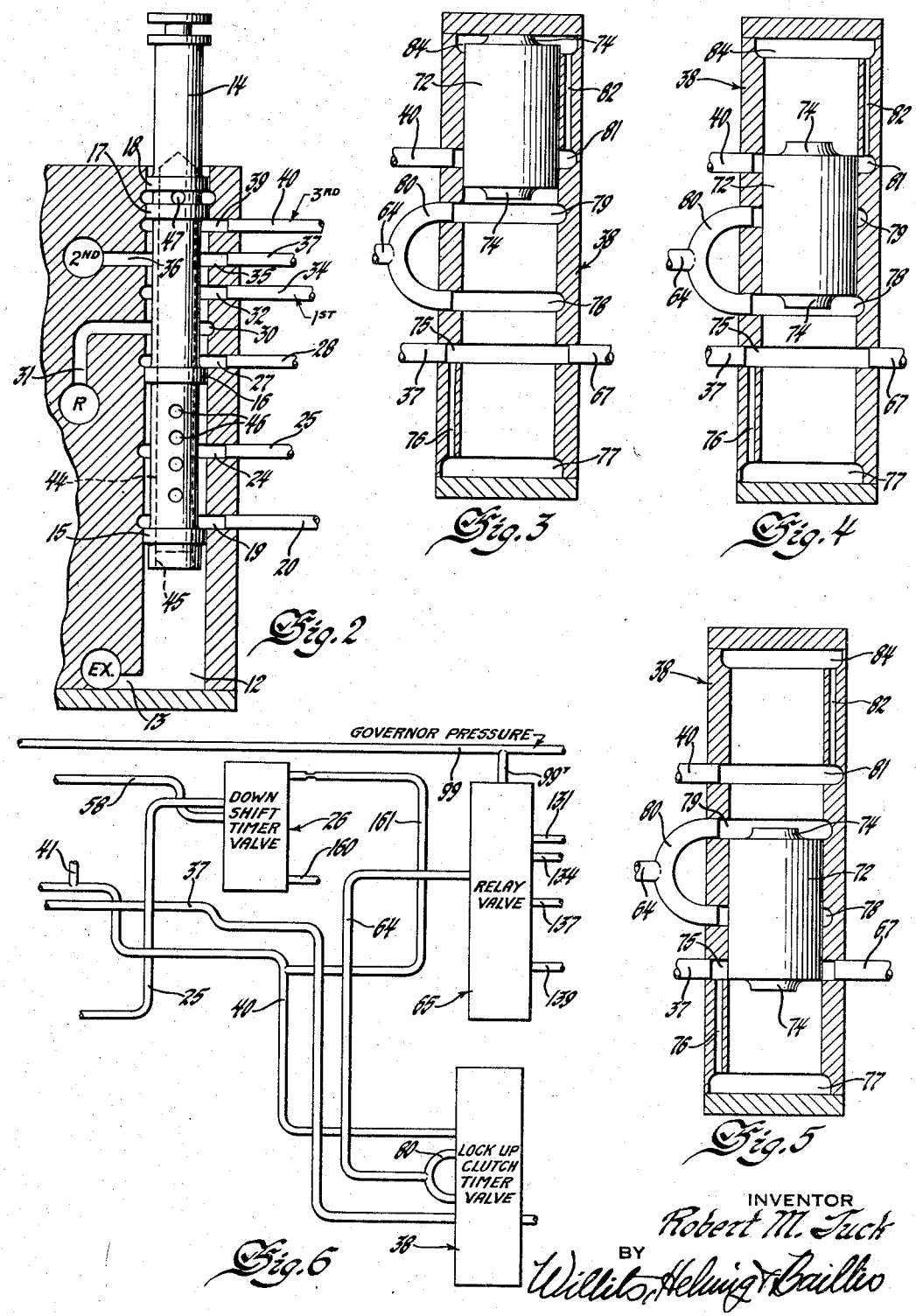

INVENTOR.
Robert M. Tuck
BY
Willits, Helwig & Baillio
ATTORNEY

United States Patent Office 2,884,806
Patented May 5, 1959

2,884,806

HYDRAULIC CONTROL SYSTEMS FOR AUTOMOTIVE TRANSMISSIONS

Robert M. Tuck, Indianapolis, Ind., assignor to General Motors Corporation, Detroit, Mich., a corporation of Delaware Application September 27, 1952, Serial No. 311,817

24 Claims. (Cl. 74—645)

This invention relates to improvements in hydraulic control systems for automotive transmissions and, more particularly, to improvements in such control systems associated with transmissions in which gear ratio selection is accomplished manually, and in which use is made of a torque converter for transmitting energy from the engine to the gearing of the transmission.

In some heavy duty vehicles, such as military tanks or trucks or commercial trucks, it has been found desirable to make use of manual control instead of automatic control of the gear ratio selection in the transmission. However, when such manual control is employed, it is recognized that an operator, after shifting the transmission into the highest speed gear ratio, may permit the transmission to remain in that gear ratio when actual driving conditions reduce the vehicle speed to a point at which it is highly desirable, if not imperative, that the transmission be shifted into a lower speed gear ratio.

It is also contemplated that the control system of this invention can be associated with a transmission in which a torque converter is employed and in which a lock-up clutch is arranged to effectively lock the driven element of the torque converter to the flywheel or other output element of the engine for eliminating the action of the torque converter under certain speed conditions. However, it is desirable that the lock-up clutch be operated only when the transmission is in the highest speed condition or in the next lower speed condition, and that actuation thereof can occur only when conditions are favorable.

The control system of the present invention is an improvement on that shown and described in my co-pending application S.N. 289,115, filed May 21, 1952, for Control for Automatic Transmission. In that application illustration has been made of a planetary gear type of transmission with hydraulic actuators for establishing three forward speeds and reverse. The apparatus also includes a torque converter interposed between the drive shaft of the engine and the planetary gearing. The only elements not shown in said application with which the present invention is concerned comprise a lock-up clutch for the torque converter, a governor for supplying governor pressure and the manifold for the engine whereby engine manifold vacuum can be supplied. These elements are of conventional character and are well known in the art.

An object of the present invention is to provide, in a manually operated transmission system, means automatically operable to down-shift from a high speed condition to the next lower speed condition.

Another object of the invention is to provide, in a hydraulic system for accomplishing the foregoing, a hydraulically operated timing valve for determining the time at which such a down-shift can occur relative to the establishment of a speed condition.

Another object of the invention is to provide timed fluid supply to operate a valve member connected to the manually controlled selector valve in such fashion that, when the speed of the vehicle falls below a predetermined minimum, the selector valve will be automatically moved to a position selecting a lower speed condition.

Another object of the invention is to provide, in a transmission system employing a torque converter and a lock-up clutch therefor, a valve for controlling the supply of fluid to operate the lock-up clutch so that such fluid is available only when the transmission is in certain selected speed conditions.

An additional object of the invention is to provide valve means which will operate to exhaust fluid supply to the lock-up clutch immediately upon the beginning of a shift from one speed condition to another, and which will reestablish the fluid supply at a predetermined time after the shift has been completed.

A further object of the invention is to provide a timer valve for accomplishing the foregoing purposes, which valve, when operated has an initial slow movement, followed by an accelerated movement, and has finally a retarded movement which may be considered to be in the nature of a movement resembling that of a dash pot.

The present control system has been devised to permit manual shifting from first speed to second speed to third speed in a three speed transmission, but to incorporate hydraulically operated mechanism for automatically down-shifting from third speed to second speed in the event the vehicle speed has been reduced to such a degree as to prove undesirable. Such down-shift prevents overheating of the transmission and also prevents operation in an inefficient range.

This control system also has incorporated therein a timer valve for determining the time at which fluid can be supplied to operate the lock-up clutch. Ordinarily, a relay valve is positioned between the timer valve and the lock-up clutch; such relay being sensitive to governor fluid pressure so that the clutch can be actuated only when the speed of the vehicle is such that the pressure of the fluid determined by the governor will permit this operation. The timer valve has been designed to be operative only when the transmission is, in this particular instance, only in second or third speed conditions; and this timer valve operates to exhaust the supply of fluid to the relay valve immediately upon the beginning of a shift from one speed condition to the other, and to reestablish the supply of fluid to the relay valve as soon as the shift has been completed, thereby making possible the actuation of the lock-up clutch as speedily as governor pressure on the relay valve will permit, which may be instantaneously or may be delayed.

Figure 7:
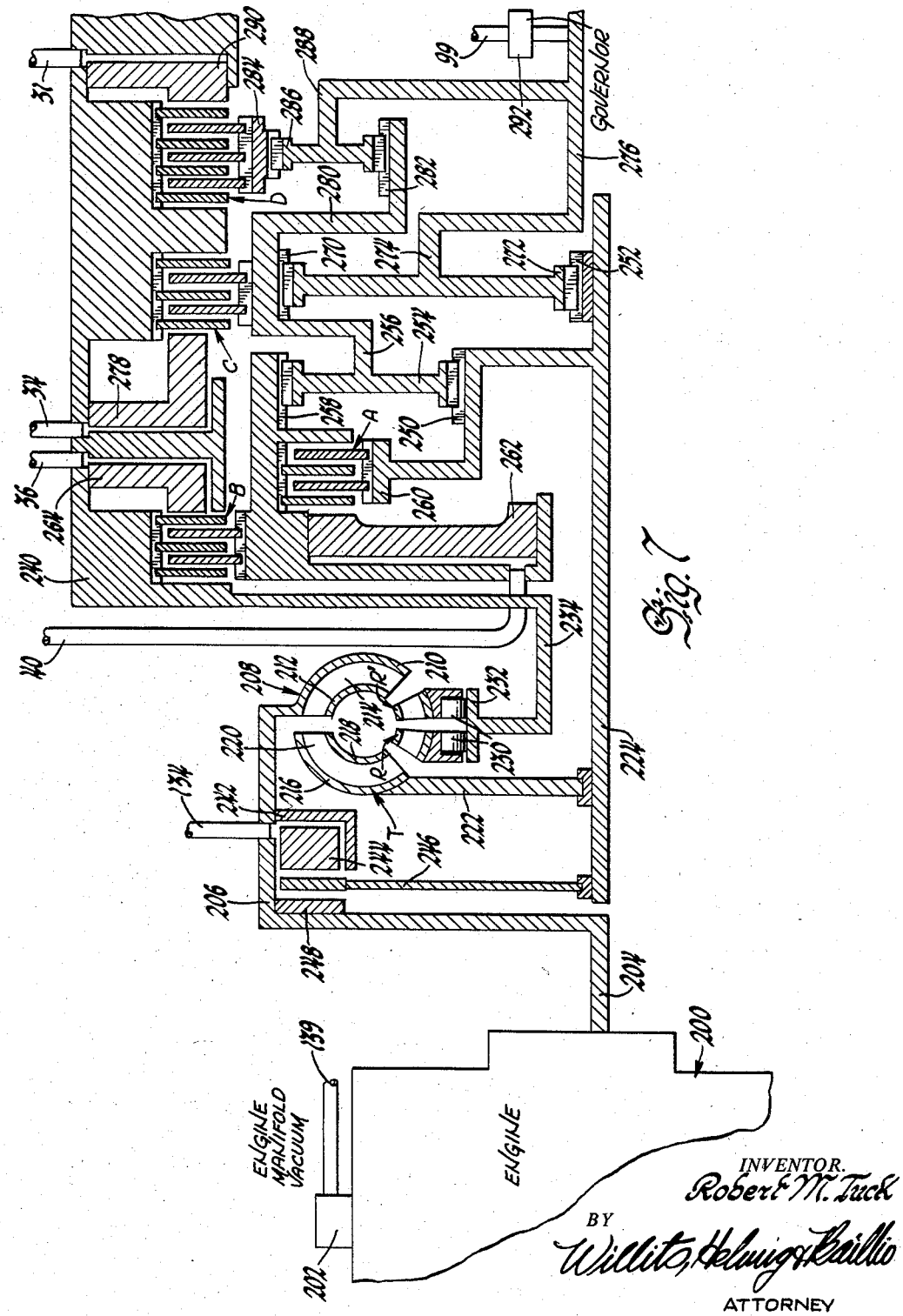

Other features, objects, and advantages of this invention will become apparent by referring to the following detailed description of the accompanying drawing, wherein:

Fig. 1 is a schematic illustration of a hydraulic control embodying the invention, Fig. 2 is a section through a part of a valve block showing, in enlarged detail, the construction of the selector valve, Figs. 3, 4, and 5 are enlarged sections showing the lock-up clutch timer valve in three positions thereof, Fig. 6 is a simplified schematic illustration of a modification of this invention, and Figure 7 is a schematic representation of the essential mechanical parts of this invention.

While the control system of this invention can be used with various types of transmissions, it was particularly designed for use in connection with a transmission involving a torque converter having a lockup clutch and a planetary gear train capable of being conditioned for three forward speed ratios and reverse. Referring to Figure 7, an engine 200 is illustrated diagrammatically, such engine being of the internal combustion type or any other well known type of prime mover. Also illustrated diagrammatically is a carburetor 202 or some other control device from which extends a pipeline 139 which is subject to engine manifold vacuum. The connection of this pipeline to the controls of the transmission will be described later.

The crankshaft 204 of engine 200 has connected thereto the pump cover 206 of a torque converter illustrated generally at 208. This pump cover 206 is extended into the outer shroud 210 of the converter pump which also has an inner shroud 212 and blades 214 therebetween. The turbine T of this torque converter has an outer shroud 216, an inner shroud 218 and blades 220 therebetween. The turbine T has a connection 222 to an intermediate driven shaft 224. Two reaction elements are indicated at R and R', such elements being made up of inner and outer shrouds with blades therebetween in conventional fashion. These reaction elements are free to rotate in the same direction as the pump and turbine but are held against reverse rotation by one-way brake elements 230 which have a common race thereof, a member 232 which is connected by a sleeve shaft 234 to the casing 240 of the transmission. The elements 230 may be the usual type of roller one-way brake device or may be sprags. The pump cover 206 has secured to the interior thereof a cylinder indicated at 242 in which is slidable a piston 244 hydraulically actuated through the supply line 134 to press a clutch plate 246 against a backing plate 248 fastened to the pump cover. Clutch plate 246 is splined or otherwise connected to the intermediate shaft 224. When oil under pressure is supplied through line 134 to the cylinder 242, the piston 244 engages this lockup clutch to compel the driven shaft 224 to rotate in unison with the input shaft 204.

The intermediate driven shaft 224 has secured thereto, in any desired fashion, sun gears 250 and 252. Sun gear 250 meshes with planet pinions 254 carried by the planet carrier 256 and these pinions 254 in turn mesh with a ring gear 258. Sun gear 250 has an extension 260 to which are splined plates of a disk clutch A, the other plates of which are splined to the ring gear 258. Piston 262 can be moved under hydraulic pressure supplied by line 40 to engage the clutch A so that the sun gear 250 and ring gear 258 are compelled to rotate in unison. A disk brake B has one set of plates splined to an extension of ring gear 258 and the other set of plates splined to a part of the housing 240. Piston 264, movable under hydraulic pressure supplied by line 36 serves to engage brake B to lock ring gear 258 against rotation.

The carrier 256 is connected to a ring gear 270 of a gear unit which includes the sun gear 252 and planet pinions 272 carried by planet carrier 274. The planet carrier 274 is connected to the transmission output shaft 276. A disk brake C has one set of plates thereof splined to the ring gear 270 and the other set of plates splined to a part of the housing 240. Piston 278, supplied with hydraulic pressure through line 34, can engage the brake C to lock ring gear 270 against rotation.

The ring gear 270 is connected by a link 280 to a reverse unit sun gear 282, which reverse unit also includes ring gear 284 and planet pinions 286 carried by the carrier 288. Carrier 288 is connected to the output shaft 276 for rotation therewith. A disk brake D has one set of plates splined to ring gear 284 and the other set of plates splined to part of the housing 240. Piston 290 can be supplied with hydraulic pressure by line 31 to engage brake D. Driven by the output shaft 276 is a governor 292 of any well known type of rotating metering valve such as that shown in Thompson Patent 2,204,872. Other types of rotatable or revolvable metering valves can be utilized all within the knowledge of the art. Metered pressure developed by the governor 292 is delivered by line 99 to various parts of the controls for the transmission.

First speed or low forward speed ratio is obtained by engagement of brake C with brakes B and D released and clutch A released. Under these conditions drive of the turbine of the converter causes rotation of sun gear 252 and due to ring gear 270 being locked against rotation, this drive is imparted to the pinions 272 and carrier 274 to drive output shaft 276 at reduced speed. Second speed ratio is obtained by locking brake B with brakes C and D released and clutch A released. In this ratio drive of the sun gear 250 by the torque converter causes the pinions 254 to be rotated in the forward direction at reduced speed due to locking of the ring gear 258. The carrier 256 being rotated at this reduced speed rotates the ring gear 270 at reduced speed so that drive of the sun gear 252 simultaneously with sun gear 250 causes the carrier 274 to be rotated at a speed depending upon the relative speeds of sun gear 252 and ring gear 270. In this condition the output shaft 276 is rotated at a reduction ratio which is a higher speed ratio than that provided by first speed.

Third speed condition is obtained by engagement of the clutch A due to the supply of fluid under pressure by line 40 to the piston 262. When clutch A is engaged, brakes B, C, and D are released. Engagement of clutch A causes sun gear 250 and ring gear 258 to rotate in unison with the result that the carrier 256 causes the ring gear 270 to rotate at the same speed as the sun gear 252. With this gear unit locked up the carrier 274 and output shaft 276 rotate at the same speed as the intermediate driven shaft 224.

Provision is made in the controls of this invention for applying the lockup clutch for the converter whenever conditions justify the same during operation in second or third speed ratios. With the lock up clutch engaged by the supply of fluid under pressure through line 134 to piston 244, the intermediate driven shaft 224 is compelled to rotate at the same speed as the input shaft 204. This lockup clutch therefore bypasses the torque converter 208 and eliminates any slipping in the drive train. The lockup clutch is applied only when the torque demand represented by engine intake manifold vacuum and governor pressure are such that torque multiplication by the converter is not necessary. The manner in which the lockup clutch is applied and the timing of the application thereof will be apparent in the description of the controls set forth hereinafter.

Reverse drive is obtained by the application of the brake D which application follows the supply of fluid under pressure through line 31 to the piston 290. When brake D is applied, brakes B and C and clutch A are released. Under this condition, drive of the intermediate shaft 224 to the sun gear 252 will result in reverse rotation of the ring gear 270 due to an initial reaction afforded by the load of the vehicle on the output shaft 276. Reverse rotation of ring gear 270 is imparted to the sun gear 282 and since ring gear 284 is held against rotation in either direction, the carrier 288 is compelled to rotate in the reverse direction at a reduced speed. This reverse rotation of carrier 288 is communicated to the output shaft 276 causing the output shaft to rotate in the reverse direction which rotation is in turn imparted to the carrier 274 and by it to the ring gear 270. The drive therefore in reverse is compounded in the two gear sets having ring gears 272 and 282.

Referring to the drawings and particularly to Fig. 1, 10 indicates generally a selector which is in the nature of a hydraulic valve made up of a body and a reciprocable valve member. The body 11 of the valve has a bore 12 in which valve member 14 can slide. Exhaust line 13 communicates with the bottom of the bore. Valve member 14 is provided with lands 15, 16, 17, and 18, all fitting snugly against the wall of the bore 12. The body 11 is provided with a port 19 in communication with a fluid line 20 which extends to the pressure pump 21 operating to draw oil through a line 22 from the usual sump of the mechanism. Pump 21 is of the usual type having associated therewith built-in or separate regulators whereby fluid under the desired pressures can be delivered. A regulator for this purpose is shown in my co-pendnig application before identified. A second port 24 has connected thereto a line 25 which extends to a port near the top of automatic down-shift timer valve 26, the operation of which will be described later. Another port 27 in the valve body communicates with a fluid line 28 which is connected to exhaust. A port 30 communicates with a line 31 which extends to the actuator for the reverse gearing of the transmission. Port 32 communicates with fluid line 34 which extends to the actuator for the first speed gearing of the transmission. Port 35 communicates with line 36 (Fig. 2) extending to the actuator for the second speed gearing of the transmission, and also a line 37 extending to a lock-up clutch timer valve 38 for operations to be described later. A final port 39 communicates with line 40 extending to the valve 38 before mentioned and having branch line 41 to the actuator for the third speed gearing of the transmission.

By reference to Fig. 2 which is an enlarged showing of the selector 10, it will be seen that member 14 has an axial bore 44, defined by dotted lines, which extends from the bottom of member 14 to a point beyond land 18. The end of the bore is closed by a plug 45. A plurality of radial openings 46 extend through the wall of the member 14 so that fluid can pass from the bore 12 through these openings into the bore 44. Another radial opening 47 extends through the wall of member 14 between lands 17 and 18 so that fluid in the bore 44 can pass through opening 47 to a selected outlet port determined by the position of the valve.

Automatic down-shift timer valve 26 is made up of a body 48 having an axial bore in which a valve member 49 may slide, such member having lands 50 and 51 and a stem part 52 around which fits a spring 54. The upper end of the valve member has a portion of reduced diameter as shown at 55. The valve body 48 is provided with a port 56 connected to the fluid line 25 before mentioned, and is also provided with a port 57 communicating with fluid line 58 which extends to automatic down-shift valve 59. Another port 60 communicates with line 61 having restriction 62 therein; the line 61 extending to another line 64 which communicates with the converter lock-up control valve 65 and also with the converter lock-up timer valve 38. A still further port 66 is in communication with line 67, also extending to valve 38.

Converter lock-up timer valve 38 comprises a body 70 having a bore 71 in which is slidably retained cylindrical valve member 72, the ends of hich are of reduced diameter, as shown in 74. Bore 71 is provided with a port 75 in communication both with lines 37 and 67. Port 75 communicates through a restricted passage 76 with the end of the bore which may be enlarged as shown at 77. Two ports, 78 and 79, are connected by conduit 80 which in turn is connected to the line 64 leading to the control valve 65. Bore 71 also has a port 81 connected to the line 40 and communicating through restricted passage 82 with the other end of the bore which may be enlarged as indicated at 84.

Automatic down-shift valve 59 comprises a body which may be integral with the body 11 above described or may be made separately, if desired. This body has a relatively short bore 90 therein, in which is slidably mounted a piston-like valve member 91 having a stem 92 extending upwardly therefrom. Spring 94 is held between the bottom of the valve member 91 and the end of the bore 90. A restricted passage 95 leads to exhaust line 96. A port 97 in the wall of the valve body has fluid line 58, before mentioned, connected thereto. A second port 98 communicates with fluid line 99 which extends to a conventional governor, for supplying fluid under pressure to this down-shift valve. This governor is driven by the propellor shaft of the vehicle and hence the pressure of fluid delivered thereby is determined by the speed of this shaft and therefore constitutes one well-known representation of vehicle speed in a form which can be utilized in a hydraulic control system.

Rotatably mounted above the valve body 11 is a quadrant 100 on shaft 101. The outer edge of the quadrant has a plurality of arc-shaped depressions therein, to be engage dselectively by the roller detent 102 pressed toward the quadrant by spring 104 acting on rocker arm 105 which carries the detent 102. A pin 103 extends outwardly from one surface of the quadrant. An extension 106 of the quadrant is connected to the outer end of valve stem 14 in any suitable manner so that rotation of the quadrant will cause reciprocation of the valve. A plurality of steps 107 are provided on a second extension of the quadrant, to be engaged at appropriate times by plunger 108 which acts as a down-shift inhibitor. As will be seen from the drawings, plunger 108 is slidably mounted in the valve body, and has the lowermost part thereof surrounded by a spring 109 fitting in an enlarged hollowed-out part which communicates with exhaust 110. The lower end of plunger 108 rests on a piston 111, slidable in the hollowed-out part, which in turn communicates with channel 112 which is connected by branch line 114 to the governor fluid supply line 99.

Converter lock-up control valve 65 comprises a body 120 having a bore 121 therein in which is slidably mounted a valve member 122 which has lands 124 and 125. The body 120 is also provided with a counterbore 126 in which an enlargement 127 in the valve member 122 snugly fits. An intermediate land 128 is positioned between the lands 124 and 127. Bore 121 has a port 130 therein, connected to exhaust line 131 and a second port 132 connected to line 134 which extends to the converter lock-up clutch. A third port 135 communicates with line 64, previously described. Bore 126 has a port 136 connected to exhaust line 137 and a second bore 138 connected by line 139 to the intake manifold of the engine with which this transmission control system is associated. Spring 140 presses the valve member 122 upwardly to the extent limited by contact of land 128 with the end of the counterbore, as will be seen in Fig. 1. A peg-ilke stop member 141 limits movement of the valve 122 against the resistance of the spring 140. The vacuum developed by the intake manifold of the engine is a representation of torque demand in a form that can be used in a control system of this type. Fluid under governor pressure is supplied to the top of the bore 121 through branch line 99' from line 99.

The operation of the control system and the coaction of the various parts thereof will be apparent from the following description. Quadrant 100 can be manually rotated by suitable mechanism such as linkage, or the like, attached to shaft 101. In the position shown in Fig. 1, the quadrant is in neutral position with a detent 102 resting in the depression marked N. In this position the valve member 14 of selector 10 is in its uppermost position in which the lands 17 and 18 are out of register with any of the ports communicating with various parts of the associated mechanism. At this time fluid from the pump 21 or from any other source is supplied to the bore 12 of the selector through line 20 and port 19 above land 15 and through openings 46 into the bore 44 of the valve member 14. Fluid cannot escape from bore 44 while the valve is in the neutral position. Should it be desired to actuate the first speed gearing of the transmission, the manual linkage can be moved by the operator to rotate the quadrant 100 to such an extent as to cause detent 102 to rest in depression marked 1 on the quadrant. Valve member 14, due to such rotation of the quadrant, is moved downwardly in the bore 12 until lands 17 and 18 are astride port 32, at which time fluid in the bore 44 can pass through radial opening 47 into the port 32 and thence through line 34 to the hydraulic actuator for the first speed gearing. In this position it will be noted that land 16 will lie below the port 24, with the result that fluid normally passing from bore 12 through line 25 to the valve 26 is prevented from reaching this port and hence, down-shift timer valve 26 is inoperative.

Should the operator desire to shift into second speed gearing, the quadrant 100 is moved to register detent 102 with the depression marked 2, at which time lands 17 and 18 are astride port 35, permitting fluid to enter this port and pass to the actuator for second speed gearing and also to pass through line 37 to the port 75 in valve 38. When this shift is made, fluid previously supplied through line 34 to the actuator for the first speed gearing is exhausted from that actuator through the bore 12 above land 16 and out of this bore through exhaust pipe 28. When the selector is in second speed position, land 16 will lie above port 24 so that fluid under pressure can pass from bore 12 through the line 25 to the down-shift timer valve 26.

As before mentioned, fluid is supplied through line 37 to the lock-up clutch timer valve 38 and, if piston 72 is in the position shown in Fig. 1, it will be apparent that the fluid under pressure can pass from the bore 71 of valve 38 through ports 78 and 79, line 80 and line 64, to the port 135 of the lock-up clutch control valve 65. Under the condition shown in Fig. 1, the fluid at port 135 is arrested by land 124 and can perform no function in this control valve. However, some of the fluid from line 64 passes through branch line 61 and restriction 62 to the top of the valve 26. Valve member 49 of this valve is held against downward movement by the spring 54 until fluid pressure, entering the space in the valve bore afforded by the end part 55 of the valve member, can flow a sufficient quantity after a suitable interval of time, determined by the restriction 62, to move valve member against the resistance of the spring. In this control system it is desired that the valve 26 be inoperative while the second speed gearing is actuated, and, accordingly, a counter-pressure fluid supply is fed to the lower end of valve 26 through line 67, extending from valve 38 to the port 66. The pressure of the fluid applied at each end of valve 26 is of equal magnitude and, consequently, spring 54 will retain the valve member 49 in its uppermost position.

While the transmission is in second speed gearing, it may be desirable to actuate the lock-up clutch for the torque converter, and such action is accomplished when torque demand (represented by engine intake manifold vacuum applied to the lower end of valve 65 through line 139) and vehicle speed (represented by fluid under governor pressure supplied to the top of valve 65 through line 99′) are in such relative magnitudes as to overcome the resistance of spring 140, with the result that valve member 122 is forced downwardly into contact with the stop 141. In this position land 124 will uncover port 135, permitting the fluid from line 64 to enter the bore of valve 65 above the land 124 and to pass from the valve body through port 132 and line 134 to the lock-up clutch. At the same time, land 125 in its downward movement has covered port 130 so that fluid cannot be exhausted from the valve through line 131. Thus it will be seen that, when governor fluid pressure and engine intake manifold vacuum are in the proper relation, the lock-up clutch can be actuated.

As the operator manually shifts from second speed gearing to third speed gearing, which in this embodiment of the invention is the highest speed gearing ratio, quadrant 100 is rotated until detent 102 rests in the depression 3, causing valve 14 to move upwardly until lands 17 and 18 are astride port 39. Since the selector valve is moved from second position to third position, line 37 is in effect connected to exhaust line 28 with the result that fluid is drawn from valve 38, and through it from valve 65, as well as from the top and bottom of valve 26. Fluid under pressure exiting from port 39 passes through line 40 to the port 81 of valve 38 and also through the line 41 to the actuator for the third speed gearing of the transmission.

Let us consider first the action that takes place in valve 38 under these conditions. Fluid entering port 81 has access to the bore 71 of the valve only through restriction 82 which leads to the end of valve member 72, and since this valve member has an end portion 74 of reduced diameter, it follows that this fluid under pressure will build up behind the valve and move it toward the other end of the body at a rate determined by the restriction 82 and the pressure of the fluid. It is apparent, therefore, that this rate of movement is relatively slow. The positions of the valve member 72 at the beginning and end of initial slow movement are shown respectively in Figs. 3 and 4. Once the valve member 72 has uncovered port 81, its movement becomes greatly accelerated since the end 74 of the valve member is now subjected to full fluid pressure. As a result of this accelerated motion, valve 72 uncovers port 79 (Fig. 5), thereby permitting the fluid under pressure to pass through line 80 and line 64 to the control valve 65 and to the top of down-shift timer valve 26. At the end of the accelerated motion which is indicated in Fig. 5, valve 72 has covered port 75 with the result that any residual fluid in the lower part of the valve can escape therefrom only through the restriction 76 which leads to port 75. Consequently, continued motion of the valve 72 toward the enlargement 77 will be retarded or decelerated since this restriction 76, in effect, establishes a dash pot of which the valve is a part so that its final motion is slow enough to prevent the valve member from striking the end of the valve body with a force which might cause damage. While the valve has been shown in a vertical position, in practice it will probably be positioned horizontally to equalize the resistance of the valve member to motion toward either end of the bore.

Considering next the action which has occurred in this change of speed gearing ratio at the control valve 65, we find that the fluid which was exhausted from port 135, and hence from the lock-up clutch through line 134, released the converter lock-up clutch so that the converter could function properly during the transition from second speed to third speed and also during the initial stages of vehicle motion in the latter speed condition. Should governor fluid pressure supplied to the top of the control valve 65, and the vacuum applied to the bottom thereof, be of such relation that it is undesirable to actuate the lock-up clutch during the initial period of third speed operation, the spring 140 has enough power to move the valve 122 to the Fig. 1 position at which time any fluid in line 134 which may not have been exhausted through line 64 will be exhausted through line 131. With the transmission in third speed gearing ratio and with fluid supply again established to port 135, it will be obvious that the lock-up clutch can again be actuated in the manner before described or, in other words, when governor fluid pressure and engine manifold vacuum are such as to be indicative of proper relation between vehicle speed and torque demand.

At the same time fluid under pressure is supplied to the control valve 65, it is also supplied to the top of the down-shift timer valve 26 and, since fluid no longer enters the bottom of this valve through line 67 (port 75 being covered by valve member 72), it follows that the fluid at the top of valve 26 can begin to cause motion of valve member 49 against spring 54 as the volume of the fluid determined by restriction 62 is increased. Within a predetermined time valve 49 is forced downwardly until port 57 is uncovered, which permits the fluid under pressure from line 25 to pass from the valve through line 58 to the port 97 of down-shift valve 59. If the speed of the vehicle is appropriate to operation in the third speed gearing ratio, fluid under pressure from the governor supplied by line 99 to the top of valve piston 91 will retain this valve piston in the Fig. 1 position, arresting fluid under pressure supplied by line 58 at the port 97. Should the vehicle speed decrease to an extent which renders it inadvisable, or uneconomical, to continue operation of the transmission in third speed gearing ratio, the pressure of the fluid determined by the governor will drop, allowing spring 94 to move the valve piston 91 upwardly, immediately uncovering port 97, thereby permitting fluid to enter the cavity below the valve piston and to assist this spring in moving the piston upwardly to the extent permitted by the dimensions of the bore 90. It will be noted that a restricted orifice 95 is located at the bottom of the bore 90 leading to the exhaust 96, but the restriction of this orifice is such that, while fluid from line 58 escapes therefrom, the rate of escape is not high enough to prevent fluid pressure from moving the valve piston to its full limit.

When the quadrant 100 was moved to the third position, the pin 103 was moved upwardly a distance measured by the base points of the depressions N and 3, but such small movement retained the pin in the path of movement of stem 92. When valve piston 91 is forced upwardly both by spring pressure and fluid pressure, stem 92 is brought into contact with pin 103 and the fluid pressure is sufficient to cause the stem to move the pin and, consequently, the quadrant from the third position to the second position, thereby moving valve member 14 from its third speed selecting position to its second speed selecting position.

With this change in the selector 10, fluid under pressure is again supplied to the line 37, while fluid previously passing through lines 40 and 41 is exhausted by escape from the top of the valve body 10 around the part of valve member 14 of reduced diameter above the land 18. Such exhaust of the fluid formerly applied to the various parts while in the third speed condition of operation withdraws fluid from the control valve 65 and down-shift timer valve 26 through the lines 61 and 64, valve bore 71 of valve 38, and line 40. The exhaust of fluid from the top of the down-shift timer valve 26 permits spring 54 to restore the valve member 49 to its Fig. 1 position, closing port 57 and thereby depriving the down-shift valve 59 of fluid supply formerly available through the line 58. Consequently, the down-shift valve is restored to its former condition since it is not contemplated that this valve be utilized during second speed operation. This exhaust of fluid from the top of the down-shift timer valve occurs slowly, due to restriction 62, hence stem 92 remains in its upmost position for a predetermined interval, preventing adventitious return of valve member 14 to its former third speed selecting position, and offering such resistance to manual shifting as to warn the operator against overruling the automatic mechanism.

Fluid was also exhausted from the control valve 65 so that the converter lock-up clutch was released during the transition from third speed gearing ratio to second speed gearing ratio, permitting the converter to function in its normal manner.

Since valve member 72 was resting against the end of the valve bore adjacent enlargement 77 at the time the shift was made from third speed to second speed, it follows that this valve member is actuated in the manner previously described but with movement in the opposite direction, i.e., with an initial slow movement determined by restriction 76; an accelerated movement following uncovering of port 75 and a final deceleration following the covering of port 81. Fluid supply to the control valve 65 is again established since the valve member has moved in its accelerated motion sufficiently to uncover the port 78.

The foregoing action described as occurring automatically will also occur upon a manual shift from third to second gearing.

From the foregoing description of the operation of this control system, it will be apparent that the lock-up timer valve 38 acts in conjunction with the selector valve 10 to exhaust fluid from the lock-up clutch as a shift is made in either direction between second and third speed gearing. Also this timer valve, being resupplied with fluid when a shift has been made, acts to reestablish fluid supply at the control valve 65 to be available to actuate the lock-up clutch after a predetermined time interval has elapsed following the selection of a new speed condition. This time interval depends upon the size of the component parts of the valve and the size of the respective restrictions 76 and 82.

It is also apparent that the down-shift timer valve 26 functions to regulate the period, after establishment of third speed gearing, during which the down-shift valve 59 is inoperative but after which it can operate if the vehicle has been slowed down to a point making that operation desirable. This delay is necessary to prevent "hunting" of the transmission since the delay permits operation in the highest speed ratio to become fully effective before a down-shift can be made automatically. It will be noted that the delay caused by the restriction 62 in the operation of valve 26 is augmented by the delay which occurs in the initial slow movement of valve member 72 and also the first part of the accelerated movement thereof. Thus the period during which the down-shift timer valve is inoperative following a shift into third speed is determined by the two valves 26 and 38.

However, the effect of the time lag created by valve 38 can be eliminated from a control system incorporating this invention, and in fact the preferred form of the invention does not utilize the timer valve 38 in this connection but instead thereof the arrangements shown in Fig. 6 is used. Reference characters employed in the description of the parts are repeated in Fig. 6 wherever appropriate. It will be noted that the connection 67 from valve 38 to the bottom of valve 26 (Fig. 1) has been eliminated. In lieu thereof, a line 160 (Fig. 6) is connected to the bottom of this valve 26 and this line is used to exhaust the space under the land 50 of valve 49 (Fig. 1). Consequently, spring pressure alone is used below land 50 in the operation of this valve. Furthermore, it will be noted that the connection 61 from line 64 has been replaced by a line 161 which is joined to the line 40 as shown. When such an arrangement is used, the valve 26 will be of such size and the component parts thereof so dimensioned as to obtain the time interval during which valve 26 prevents operation of the automatic down-shift valve 59 following the establishment of third speed operation. This operation is exactly in accordance with the operation described previously in connection with Fig. 1.

The down-shift inhibitor, before mentioned (Fig. 1), made up of the plunger 108, spring 109, and valve piston 111 operates to prevent a manual down-shifting from one speed gearing condition to a lower speed ratio gearing condition when the vehicle speed is such that a down-shift would be dangerous to parts of the equipment. For this purpose fluid under governor pressure enters below valve piston 111 through the branch line 114 from line 99 and the port 112. Should this pressure, determined by the speed of the vehicle, be high enough to move piston 111 and hence plunger 108 upwardly against resistance of spring 109, such upward movement can extend the top end of the stem into the path of rotation of one of the steps 107 on the quadrant extension. When in this position the end of the stem will impede clockwise rotation of the quadrant, and hence down-shifting, until the vehicle speed is reduced to a degree at which the spring 109 will overcome reduced governor fluid pressure and permit the piston 111 to move downwardly under the impetus of spring 109.

From the foregoing, it will be seen that the present invention provides a hydraulic control system for manually operated transmissions employing lock-up clutches for the torque converter associated with the transmission in which provision is made for controlling the supply of fluid to operate this clutch during and after the transition from one selected speed condition to the other selected speed condition. Furthermore, it will be evident that the control system incorporates a timed automatic mechanism for down-shifting to second speed from third speed when the vehicle speed has been reduced to the degree demanding such change. It will be apparent that modification beyond the illustrated embodiments can be made without departing from the scope of the invention, which is defined by the following claims.

What is claimed is:

1. In a transmission system having a torque converter having an input and an output, a hydraulically actuated lock-up clutch between said input and said output, a change speed gear transmission driven by said output and being provided with hydraulic actuators for establishing each of more than two forward speed conditions, a hydraulic control system therefor, which comprises manual selector valve means for supplying fluid to operate said hydraulic actuators to selectively establish each of said more than two forward speed conditions, means actuated independently of manual selector valve means actuation for supplying fluid to operate said lock-up clutch when and only when said transmission is operating in either one of two of said speed conditions and the speed of the transmission rises above a predetermined value, and valve means for further controlling with predetermined timing the supply of said fluid to operate said lock-up clutch during the transition from one of said two speed conditions to the other thereof.

2. In a transmission system in accordance with claim 1 the improvement which comprises a control valve interposed between said valve means and said lock-up clutch, and means for operating said control valve to pass fluid to said lock-up clutch when vehicle speed and torque demand are in a predetermined relation.

3. In a transmission system having a torque converter having an input and an output, a lock-up clutch between said input and said output, a change speed gear transmission driven by said output and being provided with individual hydraulic actuators for each of a plurality of forward speed conditions, a hydraulic control system comprises a selector valve, means for supplying fluid under pressure to said selector valve to operate selectively said individual actuators and for simultaneously supplying fluid to operate said lock-up clutch when and only when either one of two of said actuators is being so supplied, movement of said selector valve from a position supplying fluid to one of said two actuators to a position supplying fluid to the other thereof causing exhaust of fluid from said one of said two actuators and from said lock-up clutch, and valve means for controlling with predetermined timing the supply of fluid to operate said lock-up clutch after fluid is supplied to said other actuator, which comprises said valve means comprising a valve casing having a cylindrical bore and a valve member movable from end to end thereof, said casing having inlet ports connected respectively to the lines supplying fluid to two of said actuators, and having an outlet port supplying fluid from said bore to said lock-up clutch, and means whereby transfer of fluid supply from one inlet port to the other causes initial slow movement of said valve member, accelerated intermediate movement thereof, and final retarded movement, fluid supply to said lock-up clutch being transferred from the supply line of one of said actuators to the supply line of the other of said actuators during movement of said valve member.

4. In a transmission system having a torque converter having an input and an output, a lock-up clutch between said input and said output, a change speed gear transmission driven by said output and being provided with individual hydraulic actuators for each of a plurality of forward speed conditions, a hydraulic control system which comprises a selector valve, means for supplying fluid under pressure to said selector valve to operate selectively said individual actuators and for simultaneously supplying fluid to operate said lock-up clutch when and only when either one of two of said actuators is being so supplied, movement of said selector valve from a position supplying fluid to one of said two actuators to a position supplying fluid to the other thereof causing exhaust of fluid from said one of said two actuators and from said lock-up clutch, and valve means for controlling with predetermined timing the supply of fluid to operate said lock-up clutch after fluid is supplied to said other actuator, which comprises said valve means comprising a valve casing having a cylindrical bore, and an inlet port near each end thereof, an individual restricted passage extending from each inlet port into communication with said bore at an end thereof, an outlet port between said inlet ports, a valve piston movable from end to end of said bore and having end positions of reduced diameter, said inlet ports being connected respectively to the lines supplying fluid to two of said actuators and said outlet port being connected to supply fluid to said lock-up clutch, said valve piston in either extreme position covering an inlet port whereby fluid supplied to that port can reach said bore only through a restricted passage to impart initial relatively slow movement of said valve pison toward the other end of said bore, movement of said piston being accelerated after the covered inlet port is uncovered and retarded after the other inlet port is covered by said piston, movement of said valve piston from one end of said bore to the other end thereof timing the transfer of fluid supply to said lock-up clutch from one actuator supply line to the other actuator supply line.

5. In a transmission system having a torque converter having an input and an output, a lock-up clutch between said input and said output, a change speed gear transmission driven by said output and being provided with individual hydraulic actuators for each of a plurality of forward speed conditions, a hydraulic control system therefor, which comprises means for supplying fluid to operate said lock-up clutch only when said transmission is operating in either one of two of said speed conditions, and valve means for controlling with predetermined timing the supply of said fluid during the transition from one of said two speed conditions to the other thereof, said valve means comprising a valve casing having a cylindrical bore and a valve member movable from end to end thereof, said casing having inlet ports connected respectively to the lines supplying fluid to two of said actuators, and having an outlet port supplying fluid from said bore to said lock-up clutch, and means whereby transfer of fluid supply from one inlet port to the other causes initial slow movement of said valve member, accelerated intermediate movement thereof, and final retarded movement, fluid supply to said lock-up clutch being transferred from the supply line of one of said actuators to the supply line of the other of said actuators during movement of said valve member.

6. In a transmission system having a torque converter having an input and an output, a lock-up clutch between said input and said output, a change speed gear transmission driven by said output and being provided with individual hydraulic actuators for each of a plurality of forward speed conditions, a hydraulic control system therefor, which comprises means for supplying fluid to operate said lock-up clutch only when said transmission is operating in either one of two of said speed conditions, and valve means for controlling with predetermined timing the supply of said fluid during the transition from one of said two speed conditions to the other thereof, said valve means comprising a valve casing having a cylindrical bore, and an inlet port near each end thereof, an individual restricted passage extending from each inlet port into communication with said bore at an end thereof, an outlet port between said inlet ports, a valve piston movable from end to end of said bore and having end positions of reduced diameter, said inlet ports being connected respectively to the lines supplying fluid to two of said actuators and said outlet port being connected to supply fluid to said lock-up clutch, said valve piston in either extreme position covering an inlet port whereby fluid supplied to that port can reach said bore only through a restricted passage to impart initial relatively slow movement of said valve piston toward the other end of said bore, movement of said piston being accelerated after the covered inlet port is uncovered and retarded after the other inlet port is covered by said piston, movement of said valve piston from one end of said bore to the other end thereof timing the transfer of fluid supply to said lock-up clutch from one actuator supply line to the other actuator supply line.

7. In a transmission system in accordance with claim 6 in which there is available fluid under governor and engine manifold vacuum pressure, the improvement which comprises a control valve interposed between said valve means and said lock-up clutch, said control valve being operated by said fluid under governor pressure, and by said engine manifold vacuum pressure.

8. In a transmission system having a torque converter having an input and an output, a lock-up clutch between said input and said output, a change speed gear transmission driven by said output and being provided with individual hydraulic actuators for each of a plurality of forward speed conditions, fluid under governor pressure and engine manifold vacuum pressure being available, a hydraulic control system therefor, which comprises a control valve opened under control of said pressures, means for supplying fluid to said control valve to operate said lock-up clutch only when said transmission is operating in either one of two of said speed conditions, and valve means for controlling with predetermined timing the supply of said fluid to said control valve during the transition from one of said two speed conditions to the other thereof, said last mentioned valve means comprising a valve casing having a cylindrical bore and a valve member movable from end to end thereof, said casing having inlet ports connected respectively to the lines supplying fluid to two of said actuators, and having an outlet port supplying fluid from said bore to said control valve, and means whereby transfer of fluid supply from one inlet port to the other causes initial slow movement of said valve member, accelerated intermediate movement thereof, and final retarded movement, fluid supply to said control valve being transferred from the supply line of one of said actuator to the supply line of the other of said actuators during movement of said valve member.

9. In a transmission system having a torque converter having an input and an output, a lock-up clutch between said input and said output, a change speed gear transmission driven by said output and being provided with individual hydraulic actuators for each of a plurality of forward speed conditions, fluid under governor pressure and engine manifold vacuum pressure being available, a hydraulic control system therefor, which comprises a control valve opened under control of said pressures, means for supplying fluid to said control valve to operate said lock-up clutch only when said transmission is operating in either one of two of said speed conditions, and valve means for controlling with predetermined timing the supply of said fluid to said control valve during the transition from one of said two speed conditions to the other thereof, said valve means comprising a valve casing having a cylindrical bore, and an inlet port near each end thereof, an individual restricted passage extending from each inlet port into communication with said bore at an end thereof, an outlet port between said inlet ports, a valve piston movable from end to end of said bore and having end positions of reduced diameter, said inlet ports being connected respectively to the lines supplying fluid to two of said actuators and said outlet port being connected to supply fluid to said control valve, said valve piston in either extreme position covering an inlet port whereby fluid supplied to that port can reach said bore only through a restricted passage to impart initial relatively slow movement of said valve piston toward the other end of said bore, movement of said piston being accelerated after the covered inlet port is uncovered and retarded after the other inlet port is covered by said piston, movement of said valve piston from one end of said bore to the other end thereof timing the transfer of fluid supply to said control valve from one actuator supply line to the other actuator supply line.

10. In a transmission system having a change speed gear transmission with an element and individual hydraulic actuators for each of a plurality of forward speed conditions, a manually operated selector, means for supplying fluid under pressure to said selector, said selector being manually operable in a plurality of forward speed positions to route fluid selectively to said actuators to respectively establish a respective forward speed condition, a supply of fluid under governor pressure proportional to the speed of said transmission element, and means operable when and only when the transmission is in a high speed condition selected by said manually operated selector including time delay means for automatically down-shifting from a higher to a lower forward speed condition upon a drop in transmission element speed and governor fluid pressure below a predetermined minimum with a predetermined time delay period.

11. In a transmission system having a change speed gear transmission with individual hydraulic actuators for each of a low speed condition and a plurality of high speed conditions, a manually operated selector, means for supplying fluid under pressure to said selector, said selector being operable to route fluid selectively to said actuators, yieldable means for retaining said selector in selected positions, a supply of fluid under governor pressure, and means operable upon a drop in pressure of said governor fluid below a predetermined minimum for automatically overcoming said yieldable means and moving said selector from position routing fluid to the actuator for a high speed condition to position routing fluid to the actuator for the next lower speed condition of said high speed conditions.

12. In a transmission system having a change speed gear transmission with individual hydraulic actuators for each of a low speed condition and a plurality of high speed conditions, a manually operated selector, means for supplying fluid under pressure to said selector, said selector being operable to route fluid selectively to said actuators, yieldable means for retaining said selector in selected positions, a supply of fluid under governor pressure, and means operable after the transmission has been operating a predetermined time in the highest speed condition for automatically overcoming said yieldable means and down-shifting to the next lower of said high speed conditions upon a drop in governor fluid pressure below a predetermined minimum.

13. In a transmission system having a change speed gear transmission with individual hydraulic actuators for each of a plurality of speed conditions, a manually operated selector, means for supplying fluid under pressure to said selector, said selector being operable to route fluid selectively to said actuators, yieldable means for retaining said selector in selected positions, a supply of fluid under governor pressure, and means operable after a predetermined period of operation in a high speed condition and upon a drop in pressure of said governor fluid below a predetermined minimum for automatically overcoming said yieldable means and moving said selector from position routing fluid to the actuator for a high speed condition to position routing fluid to the actuator for the next lower speed condition.

14. In a transmission system having a change speed gear transmission with individual hydraulic actuators for each of a low speed condition and a plurality of high speed conditions, a manually operated selector, means for supplying fluid under pressure to said selector, said selector being operable to route fluid selectively to said actuators, a supply of fluid under governor pressure, means operable only when the transmission is in the highest speed conditions for automatically down-shifting to the next lower of said high speed conditions upon a drop in governor fluid pressure below a predetermined minimum, and a timer valve for preventing operation of said last mentioned means for a predetermined period following establishment of the highest speed condition.

15. In a transmission system having a change speed gear transmission with individual hydraulic actuators for each of a plurality of speed conditions, a manually operated selector, means for supplying fluid under pressure to said selector, said selector being operable to route fluid selectively to said actuators, a supply of fluid under governor pressure, means operable upon a drop in pressure of said governor fluid below a predetermined minimum for automatically moving said selector from position routing fluid to the actuator for a high speed condition to position routing fluid to the actuator for the next lower speed condition, and a timer valve for preventing operation of said last mentioned means for a predetermined period following the routing of fluid to the actuator for a high speed condition.

16. In a transmission system having a change speed gear transmission with individual hydraulic actuators for each of a plurality of speed conditions, a manually operated selector, means for supplying fluid under pressure to said selector, said selector being operable to route fluid selectively to said actuators, a supply of fluid under governor pressure, a piston biased in one direction against fluid under governor pressure, means for increasing said biasing when the pressure of said governor fluid drops below a minimum, and a connection between said piston and said selector for moving said selector from a position establishing a high speed condition to a position establishing the next lower speed condition when said biasing is increased.

17. In a transmission system having a change speed gear transmission with individual hydraulic actuators for each of a plurality of speed conditions, a manually operated selector, means for supplying fluid under pressure to said selector, said selector being operable to route fluid selectively to said actuators, a supply of fluid under governor pressure, a cylinder having a port in the wall thereof, a valve for said port comprising a piston, said piston being biased in one direction and subject to fluid under governor pressure to move it in the other direction, a line for supplying fluid under pressure to said port, a timer valve in said line, said timer valve being operated by fluid pressure to the actuator of the highest speed condition to admit fluid to said line, said port being opened by said piston when governor fluid pressure drops below a minimum to admit fluid from said line to move said piston further in the direction of biasing, a connection between said piston and said selector, said last mentioned movement of said piston operating said connection to move said selector from position routing fluid to the actuator of the highest speed condition to the position routing fluid to the actuator of the next lower speed condition.

18. In a transmission system having a change speed gear transmission with individual hydraulic actuators for each of a plurality of speed conditions, a manually operated selector, means for supplying fluid under pressure to said selector, said selector being operable to route fluid selectively to said actuators, a supply of fluid under governor pressure, a cylinder having a port in the wall thereof, a valve for said port comprising a piston, said piston being biased in one direction and subject to fluid under governor pressure to move it in the other direction, a line for supplying fluid under pressure to said port, a timer valve in said line, said timer valve being operated after a predetermined interval by fluid pressure to the actuator of the highest speed condition to admit fluid to said line, said port being opened by said piston when governor fluid pressure drops below a minimum to admit fluid from said line to move said piston further in the direction of biasing, a connection between said piston and said selector, said last mentioned movement of said piston operating said connection to move said selector from position routing fluid to the actuator of the highest speed condition to the position routing fluid to the actuator of the next lower speed condition.

19. In a transmission system having a change speed gear transmission with individual hydraulic actuators for each of a plurality of speed conditions, a manually operated selector, means for supplying fluid under pressure to said selector, said selector being operable to route fluid selectively to said actuators, a supply of fluid under governor pressure; a piston biased in one direction against fluid under governor pressure, and means operable after a predetermined period of operation in the highest speed condition for increasing said biasing when the pressure of said governor fluid drops below a minimum, and a connection between said piston and said selector for moving said selector from position establishing the highest speed condition to position establishing the next lower speed condition when said biasing is increased.

20. In a transmission system having a change speed gear transmission with hydraulic actuators for establishing a plurality of forward speed drive conditions and a reverse drive condition, a manually operable selector mounted for consecutive sequential movement in increments through a consecutive series of drive positions having a plurality of forward speed drive positions consecutively from a high speed position through a lower speed position and to a reverse drive position, means for supplying fluid under pressure to said selector, said selector being manually operable to route fluid selectively in each of said positions to said actuators to establish the respective drive condition for each position, a supply of fluid under governor pressure proportional to the speed of said transmission, means engaging said selector and operated by said governor pressure to prevent each increment of said consecutive movement of said manual selector from a high speed position to said lowest speed position and to reverse position until said governor fluid pressure falls below a predetermined minimum of consecutively lower value for each increment of movement.

21. The invention defined in claim 20 and means operative when and only when the transmission is in a high speed condition selected by said manually operated selector for automatically downshifting from a higher to a lower forward speed condition upon a drop in transmission element speed and governor fluid pressure below a predetermined minimum.

22. In a transmission system having a change speed gear transmission with an element and individual hydraulic actuators for each of a plurality of forward speed conditions, a manually operated selector, means for supplying fluid under pressure to said selector, said selector being manually operable in a plurality of forward speed positions to route fluid selectively to said actuators to respectively establish a respective forward speed condition, a supply of fluid under governor pressure proportional to the speed of said transmission element, a piston located in a control cylinder, means biasing said piston in one direction, means connecting said piston to said manually operated selector to move said selector from a higher to a lower forward speed condition on movement in said one direction, means connecting said governor pressure to said piston to move said piston in the opposite direction, a source of fluid operable when and only when the transmission is in a high speed condition selected by said manually operated selector and controlled by said piston responsive to a drop in transmission element and governor fluid pressure below a predetermined minimum to act on said piston to move said piston in said one direction to automatically downshift said manually operated selector from a higher to a lower forward speed.

23. In a transmission system having a variable ratio drive mechanism with individual hydraulic actuators for each of a plurality of speed conditions, a hydraulic control system therefor which comprises control means for supplying fluid to one of said hydraulic actuators, valve means movable with predetermined timing sequentially through a first, second and third range of positions in response to the supply of fluid to said one of said hydraulic actuators by said control means and in one range of positions permitting and in another range of positions preventing the supply of fluid to another of said hydraulic actuators, said valve means having a movable element controlling said predetermined timing of movement of said movable valve means, and means to move said movable element controlling said movable element at a low rate in said first range of positions, means to move said movable element at a fast rate in said second range of positions and means to move said movable element at a slow rate in said third range of positions.

24. In a transmission system having a variable ratio drive mechanism with individual hydraulic actuators for each of a plurality of speed conditions, a hydraulic control system therefor which comprises control means for supplying fluid to one of said hydraulic actuators, valve means movable with predetermined timing sequentially through a first, second and third range of positions in response to the supply of fluid to said one of said hydraulic actuators by said control means and in said first and third ranges of positions permitting and in said second range of positions preventing the supply of fluid to another of said hydraulic actuators, said valve means having a movable element controlling said predetermined timing of movement of said movable valve means, and means to move said movable element controlling said movable element at a low rate in said first range of positions, means to move said movable element at a fast rate in said second range of positions and means to move said movable element at a slow rate in a third range of positions.

References Cited in the file of this patent

UNITED STATES PATENTS

| | | |
|---|---|---|
| 2,150,950 | Thoma | Mar. 21, 1939 |
| 2,223,716 | Bojesen | Dec. 3, 1940 |
| 2,372,817 | Dodge | Apr. 3, 1945 |
| 2,516,203 | Greenlee et al. | July 25, 1950 |
| 2,523,783 | Schjolin | Sept. 26, 1950 |
| 2,595,969 | McFarland | May 6, 1952 |
| 2,609,706 | Jandasek | Sept. 9, 1952 |
| 2,612,061 | Schjolin | Sept. 30, 1952 |
| 2,616,310 | Jandasek | Nov. 4, 1952 |
| 2,627,189 | McFarland | Feb. 3, 1953 |
| 2,630,895 | McFarland | Mar. 10, 1953 |
| 2,667,085 | Ackerman | Jan. 26, 1954 |
| 2,675,102 | Robinson | Apr. 13, 1954 |
| 2,679,768 | Baule | June 1, 1954 |
| 2,693,260 | Lucia | Nov. 2, 1954 |
| 2,693,711 | Kelbel et al. | Nov. 9, 1954 |
| 2,697,363 | Sheppard | Dec. 21, 1954 |
| 2,737,824 | Livermore | Mar. 13, 1956 |
| 2,738,689 | Dodge | Mar. 20, 1956 |
| 2,807,968 | Forster | Oct. 1, 1957 |